H. A. HEMPEL.

Assignor to J. A. DINGENS & M. HEMPEL,

Printers' Furniture.

No. 8,321. Reissued July 9, 1878.

Chas. J. Buchholz
H. K. Dorier } Witnesses

Henry A. Hempel Inventor
by Wilhelm & Bonner
Attorneys

THE NORRIS PETERS CO., PHOTO-LITHO., WASHINGTON, D. C.

UNITED STATES PATENT OFFICE.

HENRY A. HEMPEL, OF BUFFALO, NEW YORK, ASSIGNOR TO JOSEPH A. DINGENS AND MAGDALENA HEMPEL, OF SAME PLACE.

IMPROVEMENT IN PRINTERS' FURNITURE.

Specification forming part of Letters Patent No. 145,800, dated December 23, 1873; Reissue No. 8,321, dated July 9, 1878; application filed June 11, 1878.

*To all whom it may concern:*

Be it known that I, HENRY A. HEMPEL, (formerly of St. Joseph, Missouri,) now of the city of Buffalo, in the county of Erie, and State of New York, have invented certain Improvements in Printers' Furniture, of which the following is a specification:

My invention relates to the wedge-shaped or tapering blocks or quoins interposed between the chase and the form for locking the latter. These quoins are generally tightened by means of a shooting-stick and mallet, which is objectionable, as the quoins are liable to be driven home with greater force than necessary, resulting in a raising of the form or injury to the chase and furniture. Sometimes screws are employed to tighten the quoins, but the screws soon wear out, and, besides, render the quoins expensive, and in most cases require too much lockage room to be practical.

The object of my invention is to produce simple, strong, and compact quoins, which are easily tightened and released, and not liable to get out of order by long-continued use.

Figure 1:
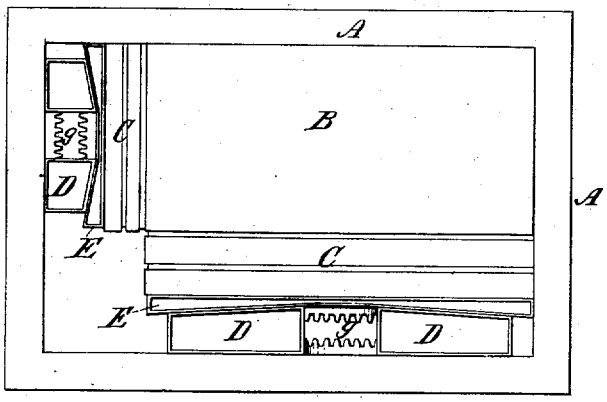
Figure 2:
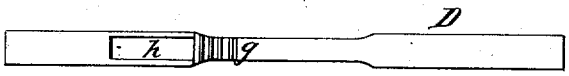
Figure 4:
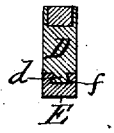
Figure 3:
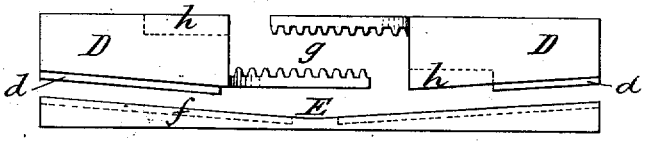
Figure 5:
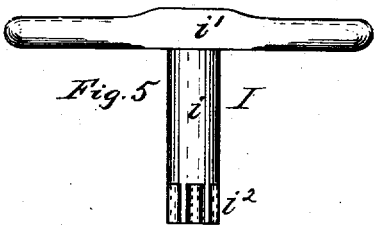
Figure 6:
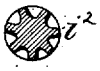

The nature of my invention will be fully understood from the following description:

In the accompanying drawing, Figure 1 is plan view of a form locked by means of my improved quoins. Fig. 2 is a side view of one of the quoins. Fig. 3 shows two quoins and a double inclined bar slightly separated. Fig. 4 is a cross-section of the quoins and bar in contact. Fig. 5 is an elevation, and Fig. 6 a cross-section, of the pinion-key.

Like letters of reference indicate like parts in each of the figures.

A represents the chase; B, the form, and C straight pieces of furniture, all of ordinary construction. D represents my improved quoins, made straight on one side and inclined on the other. E is a double inclined bar arranged between the quoins D and the chase or the furniture, as the case may be. The bevels of the bar E correspond with that of the quoins D, and the inclined sides of the quoins are preferably provided with dovetail ribs *d*, and those of the bar E with corresponding grooves *f*, to prevent the quoins from being laterally displaced and springing the form.

*g g* are rack-bars or toothed arms projecting from the adjacent ends of the quoins, the teeth being formed on the inner sides of the arms, and the arms arranged at a sufficient distance apart to permit a pinion to be inserted between them for tightening and releasing the quoins. *h* is a groove or recess formed in each of the quoins, for receiving the rack-bar *g* of the opposite quoin. I is the pinion-key for operating the quoins. It is composed of a shank, *i*, carrying at one end a suitable handle, $i^1$, and provided at its opposite end with teeth $i^2$, adapted to engage with the rack-bars *g* of the quoins, as clearly shown in Figs. 5 and 6.

The form being placed in the chase and the quoins arranged, as shown in Fig. 1, between the chase and the double inclined bar E, the pinion-key is engaged between the rack-bars *g g*, and turned in the proper direction, whereby the quoins are caused to move from each other simultaneously, and up the inclined sides of the bar E. If one quoin encounters more resistance to this movement than the other, the quoin meeting the least resistance will move faster than the other until the resistance or pressure upon both quoins is equalized. In this manner the two quoins are always forced with an equal pressure between the chase and the form, and the latter is uniformly and securely locked without requiring any special effort on the part of the printer. By turning the pinion-key in the opposite direction the quoins are released.

In tightening the quoins by means of the pinion-key the operator feels the force he is exercising in locking the form, and is thereby enabled to graduate the force employed to the requirements of the form, which is not the case in the same measure in screw-quoins, and not at all when a shooting-stick and mallet are employed.

Injury to the chase or furniture by an excess of pressure is easily avoided in the use of my improved quoins, which are, furthermore, very simple in construction, and can be produced at comparatively small expense.

I claim as my invention—

1. The combination of a pair of quoins, provided with rack-bars *g*, with a pinion-key, whereby the two quoins are geared together and caused to move in opposite directions in tightening and loosening the quoins, substantially as set forth.

2. A pair of quoins, D D, provided with parallel rack-bars *g g*, adapted to be operated simultaneously by a pinion-key inserted between them, substantially as set forth.

3. The combination of the quoins D D, provided with rack-bars *g g*, the pinion I, and double inclined frame or bar E, substantially as shown and described.

HENRY A. HEMPEL.

Witnesses:
EDWARD WILHELM,
JOSEPH A. DINGENS.